UNITED STATES PATENT OFFICE.

DANIEL ELIJAH COLLINS, OF BALTIMORE, MARYLAND.

REFRACTORY COMPOSITION.

1,411,842. Specification of Letters Patent. Patented Apr. 4, 1922.

No Drawing. Application filed May 19, 1921. Serial No. 470,956.

*To all whom it may concern:*

Be it known that I, DANIEL E. COLLINS, a citizen of the United States, residing at Baltimore, State of Maryland, have invented certain new and useful Improvements in Refractory Compositions, of which the following is a specification.

My invention relates to a refractory-composition suitable for high temperature uses. The object of my invention is the provision of a refractory-composition adapted to vitrify under the influence of heat and capable of being used either in the form of a plastic mass adapted to act as a cement to bond the elements of the refractory lining, or in the form of a liquid wash.

A mixture of fire clay and hydraulic cement, such as Portland cement, may form a satisfactory brick, but my experiments have shown that it does not form a satisfactory bond or glaze. I have found that a mixture of fire clay, hydraulic cement, such as Portland cement, and a metallic sulfide, for example, iron sulfide or copper sulfide in the form of pyrites, forms an effective bonding-material for fire bricks. My invention is not limited to the use of the particular metallic sulfides set forth, as other sulfides may be substituted therefor, but I find a better bond is obtained when the composition contains iron sulfide or copper sulfide, and in the preferred form the latter compound is present.

While the proportions in which the constituents set forth are combined may be varied, I find that the constituents combined in the following proportions produce an effective bond:

| Fire clay. | Portland cement. | Copper sulfide. |
|---|---|---|
| 40 parts | 8 parts | $\frac{1}{64}$ part |
| 48 " | 8 " | $\frac{1}{64}$ " |
| 40 " | 8 " | $\frac{1}{32}$ " |

I have also found that part of the fire clay may be replaced by substantially pure silica, as set forth in the following composition:

| Fire clay. | Portland cement. | Copper sulfide. | Silica. |
|---|---|---|---|
| 40 parts | 8 parts | $\frac{1}{64}$ part | 8 parts |

Salt and similar agents well known in the art may be added to the composition.

When used as a cement the composition may be prepared as follows:

The fire clay and Portland cement are ground to about 100 mesh and sulfide added, either in the form of small lumps or as a powder, but preferably in the latter condition. These ingredients are well mixed and enough water added to form a plastic mass adapted to be applied to the refractory bricks as they are put in place and to vitrify to form a bond under the influence of heat. Ordinary fire bricks will not disintegrate at a temperature of 3200° F. and the cement-composition set forth will stand the same amount of heat. This intense heat will cause some of the cement to melt and run from in between the bricks over the sides of the same forming a glaze thereon, protecting the bricks from slagging and increasing their life.

The refractory-composition may be mixed thin to form a wash and in this state may be applied to refractory bricks to glaze the same, decreasing their tendency to slag and thereby prolong their life. In this form it is especially suitable for coating crucibles, foundry ladles and slag pots.

I claim:

1. A refractory bonding and glazing composition comprising fire-clay, a hydraulic cement and a metallic sulfide.

2. A refractory bonding and glazing composition comprising fire-clay, silica, a hydraulic cement and metallic sulfide.

3. A refractory bonding and glazing composition comprising fire-clay, Portland cement and a metallic sulfide.

4. A refractory bonding and glazing composition comprising fire-clay, a hydraulic cement and copper sulfide.

5. A refractory bonding and glazing composition comprising forty parts fire-clay, eight parts hydraulic cement and one-sixty-fourth to one-thirty-second of a part of a metallic sulfide.

6. A refractory bonding and glazing composition comprising forty parts fire-clay, eight parts Portland cement and one-sixty-fourth to one-thirty-second part of copper sulfide.

In testimony whereof, I hereunto affix my signature.

DANIEL ELIJAH COLLINS.